Dec. 15, 1970   J. A. ZUTKIS   3,548,301
TRANSISTORIZED CIRCUIT FOR MEASURING OPERATE
AND RELEASE CURRENTS OF RELAYS
Filed Oct. 23, 1968
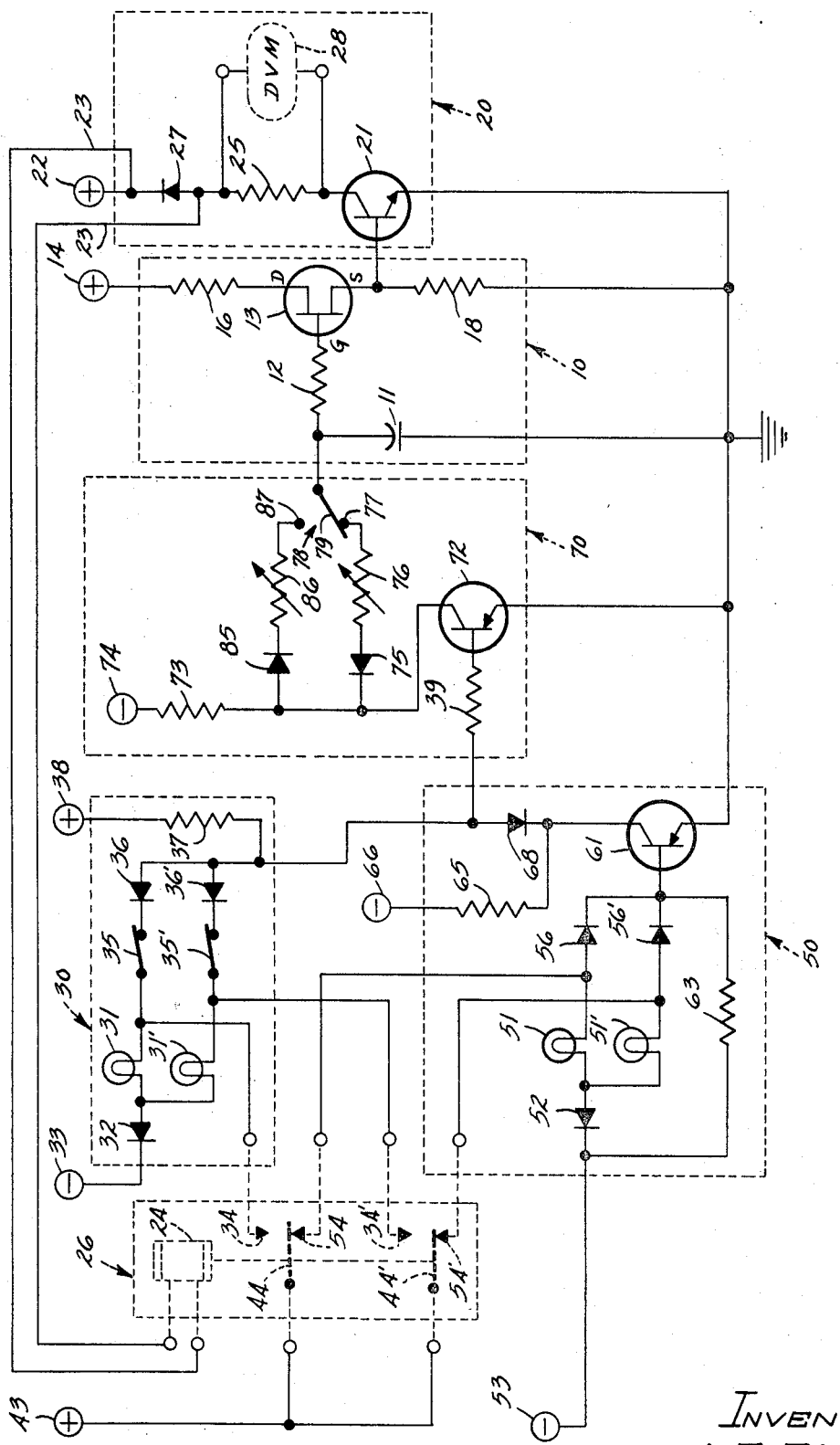
INVENTOR
J. A. ZUTKIS
BY a. J. Nugent
ATTORNEY United States Patent Office
3,548,301
Patented Dec. 15, 1970

3,548,301
TRANSISTORIZED CIRCUIT FOR MEASURING OPERATE AND RELEASE CURRENTS OF RELAYS
Joseph A. Zutkis, Mountainside, N.J., assignor to Western Electric Company, Incorporated, New York, N.Y., a corporation of New York
Filed Oct. 23, 1968, Ser. No. 769,808
Int. Cl. G01r 31/02
U.S. Cl. 324—28                                                              3 Claims

ABSTRACT OF THE DISCLOSURE

A circuit for supplying varying current to the operate coil relay, holding the current constant at the values at which the relay operates and releases, and then determining such values. The exponential discharging voltage across a capacitor is applied to the gate of a field effect transistor whose current, amplified if required, drives the relay coil.

BACKGROUND OF THE INVENTION

This invention relates to electrical measuring systems for determining the voltage or current level, at which a device under test experiences an operating conditions, and more particularly, to relay testing circuits which determine the operate and release currents of a relay.

In the testing of electro-mechanical devices, it is often important to determine the voltage or current level at which the unit under test shows changes in operating conditions. For example, in manufacturing relays, it is frequently desirable to test every relay for operate and release currents. Because production rates of these devices can be very high, rapid testing techniques are desirable. The techniques most commonly used involve applying a test voltage or current to the unit under test, gradually varying the level smoothly until the anticipated change in operating conditions occurs, and then maintaining the test voltage or current essentially constant while the voltage or current is measured.

Circuits previously used for determining relay operate and release current suffer various disadvantages. For example, the voltage across a large capacitor has been applied directly to the coil of the relay; while this approach has worked, it suffers the disadvantage that it requires the operator to adjust a balancing network to compensate for the current drawn by the voltmeter used to measure the capacitor voltage. A more sophisticated system using vacuum tubes has also been taught but this system requires relatively high voltages for operating the tubes, with their attendant possible personnel hazards and danger of insulation breakdown, and requires additional relays for logic switching in the associated testing apparatus. The operate time of these additional relays introduces sigficant error in the measurement unless the value of the applied current changes slowly.

SUMMARY OF THE INVENTION

In accordance with the present invention, there is provided an electrical measuring system wherein a varying voltage established across a capacitor is applied to the gate of a field effect transistor to control the current flow through the field effect transistor. The current, amplified if required, is supplied to the operating coil of the device under test to establish an operating condition in the device. The condition of the device is sensed and upon the determination of a given condition, the variation of the voltage across the capacitor is stopped and maintained substantially constant, and the current supplied to the device under test is measured.

BRIEF DESCRIPTION OF THE DRAWING

The invention will be more clearly understood by reference to the following detailed description of an embodiment thereof, in conjunction with the accompanying drawing, the single figure of the drawing showing a schematic circuit diagram of a relay test circuit embodying this invention.

DETAILED DESCRIPTION

Referring to the attached drawing, the relay test circuit shown therein as indicated by the dashed lines, is comprised generally of a ramp generating and holding circuit 10; a current amplifier and measuring circuit; normally open contacts and normally closed contacts, logic circuits 30 and 50, respectively; and an operate-release timing circuit 70.

In the ramp generating and holding circuit 10, the voltage across a capacitor 11 having one terminal connected to ground, is coupled through a resistor 12 to the gate electrode G of a metal oxide semiconductor (MOS) depletion type field effect transistor (FET) 13, whose current flows from a source of positive potential 14 through a current limiting resistor 16 to the drain electrode D, and from the source electrode S through a load resistor 18 to ground. The FET characteristics are not extremely critical; for example, types 2N4302 and 2M4304 have been found satisfactory for use without circuit modification.

In the current amplifier and measuring circuit 20, the base electrode of a NPN power transistor 21 is connected to the source electrode S of FET 13. The load current of the transistor 21 is the operating coil 24 of a relay 26 to be tested; the relay 26 also including movable contacts 44 and 44', normally open fixed contacts 34 and 34', and normally closed fixed contacts 54 and 54'. The load current flows from a source of positive potential through leads 23 through the coil 24 of the relay under test and then through a current measuring resistor 25 to the collector electrode of the transistor 21. The emitter electrode of transistor 21 is connected to ground. A voltage pulse suppression diode 27 is connected across the terminals of the coil of the relay under test, and a digital voltmeter 28 is connected across the resistor 25 to measure the current flowing through the relay coil.

In the normally open contacts logic circuit 30, indicator lamps 31 and 31' have their first terminals connected through a protective diode 32 to a source of negative potential 33, and their second terminals connected to the normally open contacts 34 and 34' of the relay 26 under test and to switches 35 and 35' in series with blocking diodes 36 and 36'. The anodes of the diodes are connected through voltage divider resistor 37 to a source of positive bias potential 38 and also through coupling resistor 39 to the operate-release timing circuit 70. The movable contacts 44 and 44' of the relay 26 under test are connected to a source of positive potential 43.

In the normally closed contacts logic circuit 50, indicator lamps 51 and 51' have their first terminals connected through a protective diode 52 to a source of negative potential 53, and their second terminals connected to the normally closed contacts 54 and 54' of the relay 26 under test and also to blocking diodes 56 and 56'. The cathodes of diodes 56 and 56' are connected to the base electrode of a PNP transistor 61 and also connected through a by-pass resistor 63 to the source of negative potential 53. The emitter electrode of transistor 61 is connected to ground and the collector electrode is connected through a biasing resistor 65 to a source of negative potential 66 and the cathode of a diode 68 whose anode is connected to the anodes of diodes 36 and 36'.

In the operate-release timing circuit 70, the coupling resistor 39 is connected to the base electrode of a PNP transistor 72 having its emitter electrode connected to ground and its collector electrode connected through a current limiting resistor 73 to a source of negative voltage 74. A charging circuit for the capacitor 11 is connected in series from the source of negative voltage 74 through resistor 73 to the cathode of a blocking diode 75, from the anode of blocking diode 75 through a variable resistor 76 to a fixed contact 77 of a single-pole double-throw manually operated switch 78 having its movable contact 79 connected to the capacitor 11.

In the "release" position of switch 78, movable contact 79 engages contact 77 so that a charging current can flow to capacitor 11 provided that the transistor 72 is cut off; when transistor 72 is conducting, its collector voltage is nearly at ground potential, so that current flow through diode 75 ceases whenever the capacitor 11 voltage is equally or more negative than the collector voltage of transistor 72.

In the "operate" position of switch 78, movable contact 79 engages fixed contact 87 to which a variable resistor 86 is connected so that a discharging circuit is established from capacitor 11 through contacts 79 and 81, through the variable resistor 86 to the cathode of a blocking diode 85 whose anode is connected to the cathode of diode 75 and the collector of transistor 72. Thus, capacitor 11 can discharge through transistor 72 when the transistor is conducting and cannot discharge when transistor 72 is cut off.

The operation of the relay test circuit will now be described. It will be assumed that a relay to be tested, such as relay 26 described above, has been interconnected to the relay test circuit by an operator as shown; that the operate-release switch 78 is in the release position as shown and described above; and that a negative potential is present on capacitor 11 as a result of previous testing. The voltage across capacitor 11 will be sufficiently negative so that the current flow through power transistor 21, and hence the coil 24 of relay 26, will be below the value at which the relay 26 will operate. The negative potential from source 33, applied to the base of transistor 72 through diode 32, lamps 31 and 31', switches 35 and 35', diodes 36 and 36' and resistor 39, overcomes the positive bias voltage applied to the base of the transistor 72 from source 38 through resistor 37, so that transistor 72 will be turned on. The positive potential from source 43, applies to the base of transistor 61 through movable contacts 44 and 44' and the normally closed contacts 54 and 54' of the relay 26 under test through diodes 56 and 56', overcomes the negative potential from source 53 applied to the base of the transistor 61 through resistor 63, so that transistor 61 will be turned off. The positive potential 43 is also applied through the aforementioned contacts to the lamps 51 and 51', and through diode 52 to the source of negative potential 53 thereby illuminating the lamps 51 and 51'. Illumination of lamps 51 and 51' assures the operator that the normally closed contacts 54 and 54' are making proper contact with the movable contacts 44 and 44', respectively. As described above, with transistor 72 being turned on, the capacitor 11 cannot be charged and due to the blocking diode 75, the capacitor 11 cannot be further discharged. Thus, the current supplied to the relay will be maintained constant for measurement.

The operator will then move the switch 78 to the "operate" position, whereupon capacitor 11 will commence discharging through the above-described circuit, and the decreasing negative voltage on capacitor 11 applied to the gate electrode G of FET 13 will cause the FET drain-source current to increase substantially linearly and the current flowing through power transistor 21 and the coil 24 to increase correspondingly. The current through the relay coil 24 will continue to increase until the level at which the relay 26 operates is reached whereupon the relay will operate. As the relay 26 operates, the connection between movable contacts 44 and 44' and the normally closed contacts 54 and 54' will be broken removing positive potential from lamps 51 and 51' whereupon the lamps will be extinguished. Positive potential will also be removed from the base of transistor 61 so that the negative bias applied through resistor 63 will turn transistor 61 on. As the relay 26 under test operates, connection also will be established between movable contacts 44 and 44' and normally open contacts 34 and 34', applying the positive potential from source 43 to lamps 31 and 31', and from the lamps through diode 32 to the negative potential source 33 whereupon the lamps 31 and 31' will illuminate. The positive potential will also be applied through switches 35 and 35' to diodes 36 and 36' which will block conduction to diode 68. Since transistor 61 will be conducting, the positive bias applied from source 38 through resistor 37 to diode 68 will cause the anode of diode 68 to be at approximately ground potential, and such voltage applied through resistor 39 will turn transistor 72 off, interrupting the discharging of capacitor 11. The currents flowing through FET 13, and through power transistor 21 and the coil 24 will then become substantially constant. The currents flowing through FET 13, and through power transistor 21 and the coil 24 will then become substantially constant. The operator can then measure the operate current, for example, by reading voltmeter 28.

After the operate current level has been measured, the operator will move switch 78 to the release position, disconnecting the aforementioned discharging circuit from capacitor 11, and connecting the charging circuit from source 74 through resistor 73, diode 75 and variable resistor 76. As the capacitor 11 charges negatively, the current through FET 13 will decrease because of the increasing negative voltage applied to its gate G through resistor 12 until the voltage across resistor 18 causes the current through transistor 21 and the coil 24 to decrease correspondingly. The current through the relay coil 24 will continue to decrease until the level at which the relay releases is reached, whereupon the relay will release thereby interrupting the decrease in current as described below. As the relay 26 releases, the connection between the movable contacts 44 and 44' and the normally open contacts 34 and 34' will be broken, removing the positive potential from diodes 35 and 35' and lamps 31 and 31' whereupon the lamps will be extinguished. The source of negative potential 33 operating through diode 32, lamps 31 and 31', switches 35 and 35', and diodes 36 and 36' will overcome the positive potential applied from source 38 through resistor 37, applying a negative bias to the base of transistor 72 and turning it on. Current flow through resistor 73 will bring the collector voltage of transistor 72 nearly to ground potential, interrupting the charging of capacitor 11. Capacitor 11 will not discharge because the reverse voltage on diode 75 and the extremely high gate leakage resistance of the FET 13 will prevent significant current flow from the capacitor. As the relay 26 releases, connection will also be established between the movable contacts 44 and 44' and the normally closed contacts 54 and 54', applying the positive potential from source 43 to lamps 51 and 51' whereupon the lamps will illuminate. At the same time the positive potential applied from movable contacts 44 and 44' to fixed contacts 54 and 54' will also be applied through diodes 56 and 56' to the base of transistor 61, turning the transistor off. Illumination of lamps 51 and 51' and extinguishing of lamps 31 and 31' will indicate to the operator that the relay has released. Since the currents through the FET 13 and through the transistor 21 and coil 24 will remain substantially constant, the operator can then measure the release current, for example by reading voltmeter 28. If the relay 26 is then removed, lamps 51 and 51' will be extinguished, and negative voltage from source 53 through resistor 63 will turn transistor 61 on; however, the voltage on capacitor 11 will remain constant within the limitations afforded by its own internal leakage, reverse leakage current through diode 75, and the gate leakage resistance of FET 13.

When the relay test circuit is first energized, or when the voltage on capacitor 11 is not sufficient to maintain the relay coil current below its operate value, interconnecting a relay 26 to the relay test circuit will cause the relay to operate regardless of the position of switch 78. Moving the switch 78 to the release position will cause the capacitor 11 to be charged as described previously, so that the relay will release and the relay testing can be performed in the normal fashion.

If the relay to be tested lacks one or more normally open contacts, for example 34 or 34', then the corresponding switch 35 or 35' will be opened by the operator prior to commencement of the test. This will disable the negative voltage applied through diode 36 or 36' from affecting the transistor 72, and the operation or lease of the relay will be sensed by other normally open contacts or by the normally closed contacts affecting the base voltage or transistor 61. In this fashion, a relay having an combination of normally open or normally closed contacts can be tested without modification of the test circuit. Furthermore, a failure of any normally open contact to close can be determined readily since the negative voltage would then be applied, for example through diode 32, lamp 31', switch 35' and diode 36' causing the transistor 72 to remain in the conducting state so that the capacitor 11 will continue to discharge even though the relay has operated. Similarly, the failure of any normally closed contact 54 or 54' to open will leave a positive voltage on the base of transistor 61, which transistor will remain cut off so that negative voltage applied through diode 68 and resistors 39 and 65 keeps transistor 72 conducting. Where relays having more than two poles are to be tested, lamp, diode and switch circuits can be added in parallel to those of 31', 35', 36', 51' and 56'.

It will be understood by those skilled in the art that the NPN and PNP transistors shown and described above could be replaced by PNP and NPN transistors, respectively, and that the diodes could be reversed, upon the appropriate reversal of polarities of the associated source potentials; and that the depletion type FET could be replaced with an enhancement type FET upon an appropriate reversal of potential applied to the capacitor 11.

It will also be understood by those skilled in the art that in the alternative to measuring the operate and release currents of the relay under test, the respective voltage or power levels at which the relay operates or releases can be measured by appropriate change in type and circuit location of measuring instruments. Further, either constant current or constant voltage type circuits may be employed to provide energy to the relay under test.

While a specific embodiment of the invention has been disclosed, it will be understood that various modifications and substitutes therefor may be made without departing from the principle and scope of this invention. Accordingly, it is to be understood that this invention has been described by way of illustration rather than limitation.

What is claimed is:

1. An electrical measuring system for determining an operating condition in a device under test; comprising:
    a field effect transistor having gate, drain and source electrodes;
    means for establishing drain-source current flow through said field effect transistor;
    power amplifying means including a first transistor having base, emitter and collector electrodes;
    means for applying potential to the base of said first transistor proportional to the drain-source current flow through said field effect transistor and for establishing collector-emitter current flow through said first transistor;
    means responsive to said drain-source current flow for supplying current to said device to establish an operating condition in said device, said means for supplying current to said device applying said collector-emitter current to said device;
    a capacitor;
    means for establishing a varying potential across said capacitor;
    means for applying said varying capacitor potential to the gate of said field effect transistor to vary the drain-source current flow through said field effect transistor;
    means responsive to said operating condition of said device for disabling said means for varying the potential across said capacitor, said disabling means including a second transistor and said means for establishing said varying capacitor across said capacitor potential including a first rectifying circuit for establishing said varying capacitor potential when said second transistor is non-conductive, a second rectifying circuit for permitting said capacitor to discharge when said second transistor is conductive and switch means for connecting either said first or second rectifying circuits, alternatively, to said capacitor;
    circuit means for connecting said second transistor to said device and for making said second transistor conductive upon the presence of an operating condition in said device; and
    means for measuring the current being supplied to the device under test.

2. Circuit for determining the operate and release currents of a relay, comprising:
    a capacitor;
    a charging circuit for establishing a varying potential across said capacitor;
    a field effect transistor having gate, drain and source electrodes;
    means for establishing drain-source current flow through said field effect transistor;
    coupling means for applying said varying capacitor potential to said gate electrode to vary the drain-source current flow through said field effect transistor;
    transistor amplifier means, responsive to said drain-source current flow for supplying operate and release currents to said relay;
    a discharge circuit including a transistor adapted to be normally conducting and for providing a discharge path for said capacitor;
    means responsive to the establishment of said operate current in said relay for rendering said transistor non-conducting to interrupt said capacitor discharge circuit and to halt variation of said drain-source current, and said means responsive to the establishment of said release current in said relay for rendering said transistor conducting to interrupt said capacitor charging circuit and to halt variation of said drain-source current; and
    means for measuring the current supplied to said relay upon the interruption of said capacitor charging and discharging circuits.

3. Transistorized circuit for measuring the operate and release currents of a relay including an operating coil and normally open and normally closed contacts; comprising:
    a capacitor:
    a charging circuit for establishing a varying potential across said capacitor;
    a field effect transistor having gate, drain and source electrodes;
    means for establishing drain-source current flow through said field effect transistor;
    coupling means for applying said varying capacitor potential to said gate electrode to vary the drain-source current flow through said field effect transistor;
    transistor amplifier means, responsive to said drain-source current flow for supplying varying current to said relay operating coil of appropriate magnitudes to establish operate and release conditions in said relay;
    a discharge circuit including a transistor adapted to be normally conducting and for providing a discharge path for said capacitor;

means responsve to the establishment of an operate condition in said relay and operable upon the closure of said normally open relay contacts to render said transistor non-conducting to interrupt said capacitor discharge circuit and to halt variation of said current supplied to said relay operating coil, and said means responsive to the establishment of a release condition in said relay and operable upon the reopening of said normally open relay contacts to render said transistor conducting to interrupt said capacitor charging circuit and to halt variation of said current supplied to said relay operating coil; and means for measuring the current supplied to said relay operating coil upon the establishment of said relay operate and release conditions.

References Cited
UNITED STATES PATENTS
3,250,988   5/1966   McGrath _____ 324—28

RUDOLPH ROLINEC, Primary Examiner

E. L. STOLARUN, Assistant Examiner